Patented Feb. 23, 1926.

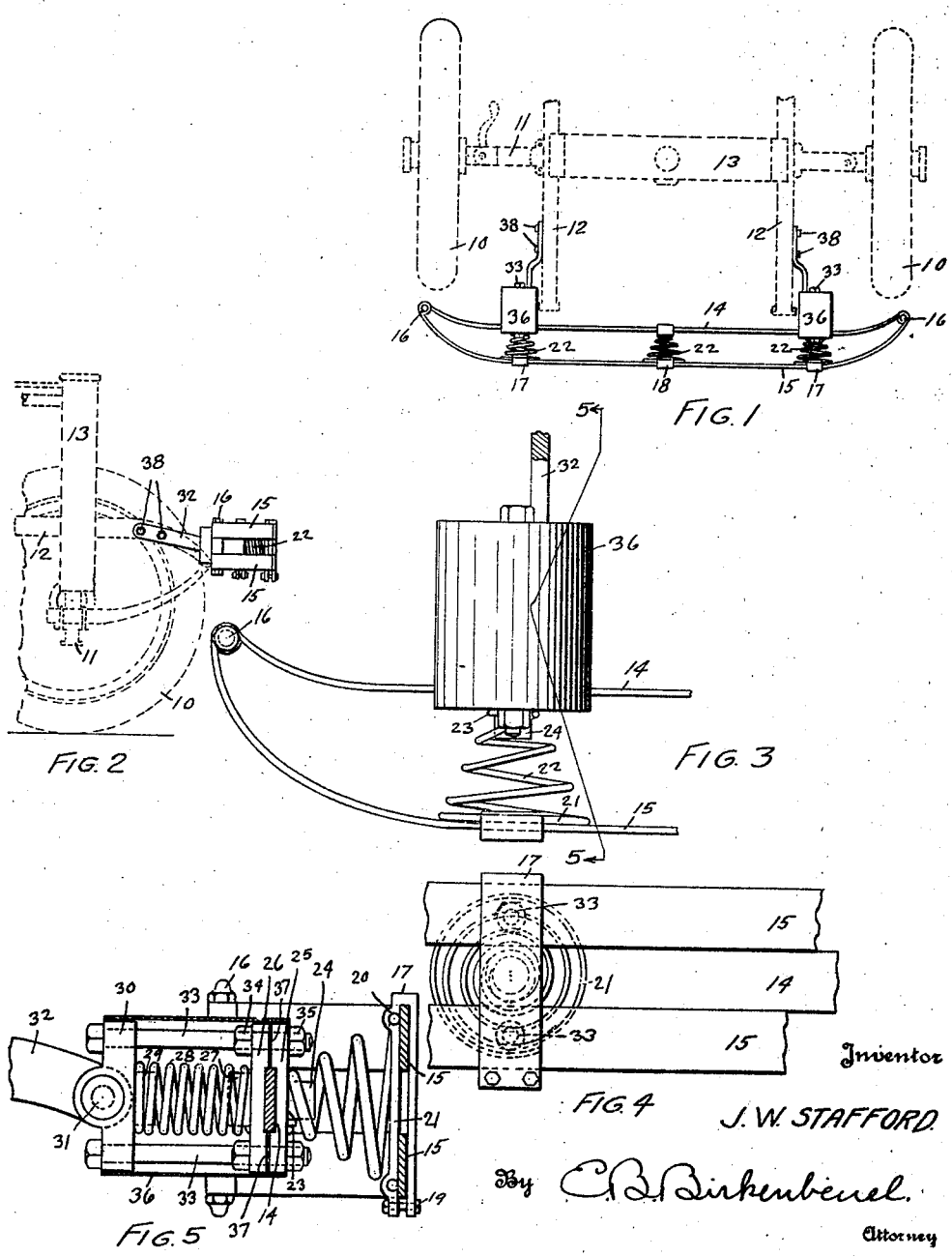

1,574,133

UNITED STATES PATENT OFFICE.

JOHN W. STAFFORD, OF PORTLAND, OREGON.

AUTOMOBILE BUMPER.

Application filed March 25, 1925. Serial No. 18,098.

*To all whom it may concern:*

Be it known that I, JOHN W. STAFFORD, a citizen of the United States, and a resident of Portland, in the county of Multnomah and State of Oregon, have invented a new and useful Automobile Bumper, of which the following is a specification.

This invention relates generally to automobiles, and particularly to a special form of bumper to be attached thereto.

The first object of this invention is to provide an exceedingly simple and efficient form of bumper in which light impacts will be absorbed in one portion of the device and unusually heavy impacts will be absorbed in another portion of the device after the capacity of the first mentioned portion has been passed.

The second object is to so construct the bumper that no holes need be formed in the metal bars which are liable to engage obstructions and to be subjected to heavy strains.

The third object is to so construct the bumper that unusual violent impacts may be sustained by an automobile without seriously endangering the occupants of the machine.

The fourth object is to so construct the bumper that it will be rigid enough for unusually heavy impacts, and at the same time resilient enough to absorb light impacts easily.

The fifth object is to so construct the bumper that the forward edge thereof may be readily adjusted to a vertical plane in order to make same adaptable to various kinds of automobiles.

These, and other objects, will become more apparent from the specification following as illustrated in the accompanying drawing in which:

Figure 1 is a plan of the forward end of a chassis showing the device attached thereto. Figure 2 is a side elevation of Figure 1. Figure 3 is an enlarged plan of one end of the bumper showing more clearly its construction. Figure 4 is a fragmentary front elevation of the bumper opposite the spring which is in line with one of the frames. Figure 5 is a section taken along the line 5—5 in Figure 3.

Similar numbers of reference refer to the same parts throughout the several views.

Referring in detail to the drawing, in order to illustrate the device and to show its relation to the automobile there is indicated, in dotted lines, the usual front wheels 10, axle 11, frames 12 and radiator 13.

Turning now to the device itself, which is shown in full lines in the drawings, it will be seen to consist of a single back bar 14 and double front bars 15 hinged at their ends by means of the bolts 16. The ends of the members 14 and 15 are preferably curved, as indicated, although not necessarily so.

In order to tie the members 15 together there are provided the vertical U-shaped clamps 17 and 18 provided at their lower open ends with the bolts 19 by means of which they may be rigidly secured across the members 15. The rear side of each of the members 17 and 18 is provided with grooves adapted to receive the end coil 21 of the conical spring 22, whose smaller closed end 23 fits around the boss 24 of the clamping bar 25.

On the rear side of the member 14 is a clamping bar 26 provided with a boss 27, around which is placed a spring 28 whose opposite end fits over a boss 29 on the arm 30, which is attached by means of the bolt 31 to the bracket 32 adapted to be bolted to the frames 12. The bolt 31 forms a hinged joint between the members 30 and 32, whose engaging faces are preferably fluted radially to insure their remaining in the desired position. Bolts 33 pass through the members 30, 26 and 25 and are provided with nuts 34 and 35 adapted to clamp the members 25 and 26 between same.

It is also preferable to groove the members 25 and 26 to insure their proper positioning on the bar 14. The members 32 are conventionally shown, as it will be readily understood that their precise form will need be varied greatly in order to accommodate the device to various sizes of cars.

The operation of the device is as follows. When installed on a car, as indicated, with the forward faces of the members 15 in a vertical plane and the bolts 31 securely tightened, the device is ready for use.

If an automobile so equipped, for instance, strikes a slight obstruction the spring bars 15 will yield and the shock will be absorbed by them, and by the conical springs 22. If the shock is greater than can be absorbed readily by the members 22 and 15 there will also be a yielding action to the bar 14.

In event, for instance, the machine were to collide with a telegraph pole in line with one of the frames 12, the spring 22, in front thereof, will collapse until the boss 24 touches the clamp 17. Further movement as taken up by the stiffer spring 28, which is made sufficiently strong to withstand the most severe impact liable to be encountered.

It will be understood that under ordinary circumstances there is no movement to the spring 28 and that therefore the bolts 33 need not slide in their arm 30, but that it is only for the unusually severe impacts that the springs 28 are called upon.

If it is desired to increase the initial tension of the springs 28 it is only necessary to so adjust the nuts 34 and 35.

In order that the springs 28 and their attendant parts may be enclosed the light metallic cylinder 36 is placed around same and is held in place by means of the lugs 37 which are held between the members 35 and 36, or in any other convenient manner.

The members 32, as previously suggested, may vary greatly and in this instance are shown as off-set in order to enable the cylinder 36 to pass along side of the frames 12.

Bolts 38 are employed to secure the members 32 to the frames 12.

It will, of course, be understood that instead of employing one spring 28 between the bolts 33 that these bolts may be moved nearer together and two or more springs may be employed by placing the bolts through the springs instead of outside of them.

I am aware that many forms of automobile bumpers have been constructed in the past, such devices therefore are not being claimed broadly, but I do intend to cover all such forms and modifications as fall fair-fairly within the appended claims.

I claim:

1. In an automobile bumper, the combination of a single spring back bar; a double spring front bar hinged at its ends to said back bar; helical springs between said front and rear bars; brackets slidably supporting said bumper in front of an automobile, said brackets having compression springs mounted thereon adapted to urge said bumper forwardly and of greater strength than the combined strength of said spring bars and said helical springs.

2. An automobile bumper, the combination of double front spring bars; a single rear spring bar hinged at its ends between said front bars; conical compression springs between said front and rear bars; clamps for attaching said conical springs to said front and rear bars; slide bolts projecting from the rear clamps; arms adapted to be attached to the car frame and slidably receive said slide bolts and compression springs between said arms and said rear clamps.

3. In an automobile bumper, the combination of double front spring members; a single rear spring hinged between said front members at their outer ends; tie clamps between said front members; conical springs held by said tie clamps between said front and rear spring bars; clamping bars on the forward side of said rear bar having means for holding said conical springs; clamping bars on the rearward side of said rear bar; arms adjustably mounted on the frame of a car; bolts slidably passing through said arms and clamping said rear bar clamping members together; and compression springs between said adjustable arms and said rear bar clamping members.

4. In an automobile bumper, the combination of a pair of spaced front and a rear spring bar member hinged at their outer ends with a plurality of compression springs mounted between said bars; slidable brackets for attaching the rear bar to an automobile frame; and springs on said slidable brackets arranged to urge said bumper forwardly.

5. In an automobile bumper, the combination of a pair of brackets adapted to be mounted on a car frame; an arm pivotally attached to each bracket and adapted to be rigidly clamped thereto; a pair of bolts slidably passing through each of said arms; spaced front and rear bumper bars; clamps on opposite sides of said rear bar held against said bar by said slidable bolts; compression springs between said pivotal arm and said clamping arms; and conical springs between said front and rear bars.

JOHN W. STAFFORD.